May 26, 1931. T. R. WARREN 1,807,328
REGULATION OF PUMPS, COMPRESSORS, BLOWERS, AND LIKE MACHINES
Filed Sept. 14, 1929
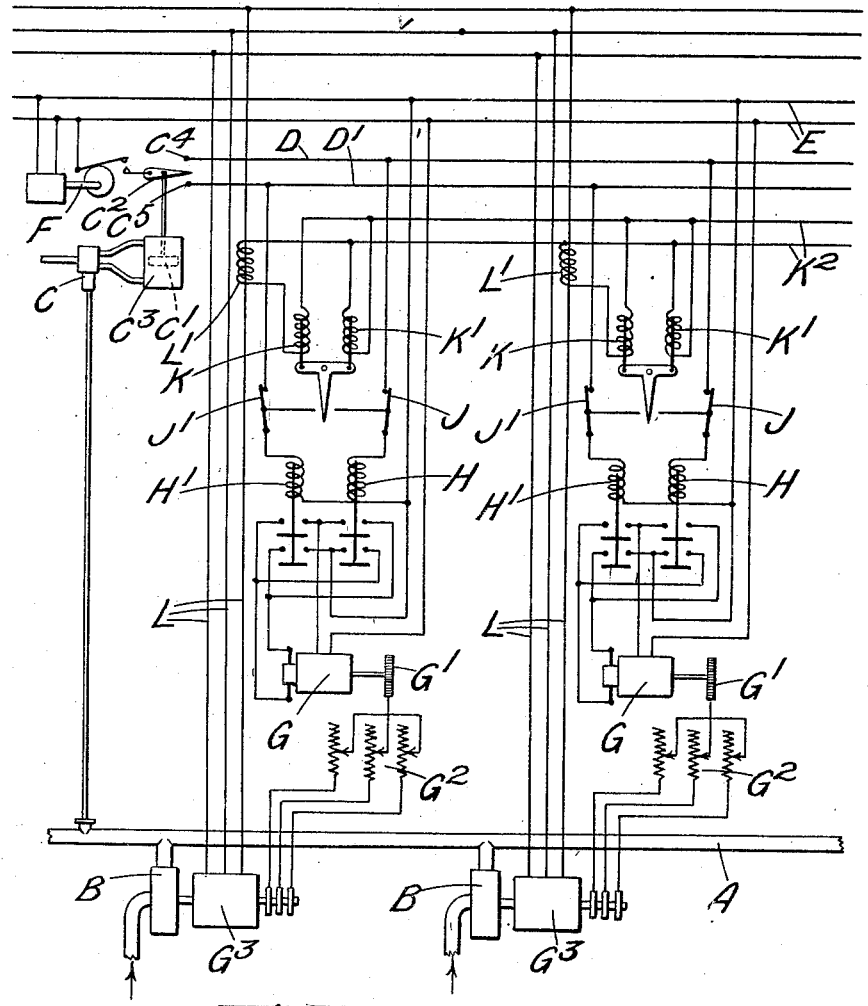
FIG. 1.
FIG. 2.
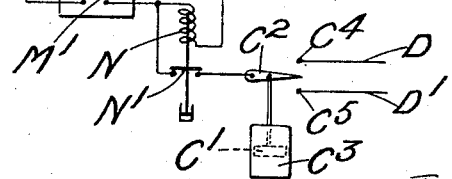

Patented May 26, 1931

1,807,328

UNITED STATES PATENT OFFICE

THOMAS REGINALD WARREN, OF NORTON-ON-TEES, ENGLAND, ASSIGNOR TO IMPERIAL CHEMICAL INDUSTRIES LIMITED, OF LONDON, ENGLAND, A COMPANY OF GREAT BRITAIN

REGULATION OF PUMPS, COMPRESSORS, BLOWERS AND LIKE MACHINES

Application filed September 14, 1929, Serial No. 392,586, and in Great Britain November 16, 1928.

This invention relates to a pressure-regulating arrangement for a group of pumps, compressors, blowers or like machines discharging into a common system, and, although not limited thereto, is more especially applicable to the regulation of a group of electrically driven rotary pumps employed, for example, for supplying boiler feed water to a turbine-driven electrical generating installation.

During recent developments in the design of rotary pumps, it has been found that, to obtain stability of operation between pumps working in parallel and to obtain freedom from surging or "water-hammer", the "pressure-gallons" characteristic of the pumps should be such that for a given speed there is a continuous fall of pressure with increase in load. This feature necessitates careful hand regulation in cases where a constant pressure is required on the delivery side, and the attempts which have been made to carry out the desired regulation automatically have usually involved the provision of costly and complicated regulating apparatus especially designed for the purpose.

The primary object of the present invention is to provide a simple and efficient pressure-regulating apparatus for automatically maintaining a constant pressure in the common discharge system of the machines.

In the arrangement according to the invention each machine has associated with it a reversible electric motor which acts in accordance with its direction of rotation to raise or lower the speed of operation of the machine, and regulating apparatus common to all the machines is provided comprising a source of intermittently interrupted electric current, and a device responsive to the pressure in the discharge system of the machines and actuating contacts controlling the supply of current from the source for determining the direction of rotation of the reversible motors, the arrangement being such that the reversible motors are caused to raise or lower the speed of the machines in accordance with whether the pressure in the system is below or above a predetermined value.

In cases where the system is utilized for supplying boiler feed water for a group of steam-turbine-driven alternators operating in parallel, the intermittently interrupted current may conveniently be derived from apparatus for automatically controlling the frequency of the electric system supplied by the alternators, such frequency-controlling apparatus being, for example, arranged in the manner described in the present applicant's copending patent application of the United States of America Serial No. 306,994.

In one convenient arrangement the contacts of the pressure-responsive device control the connection of the source of intermittent current to one or other of two circuits in accordance with the pressure in the system, and the direction of the energizing current supplied to each reversible motor may then be controlled by two relays respectively energized from the two circuits.

Means are preferably provided for ensuring a proper distribution of the load between the individual machines. This may be effected by providing each machine with a load-sharing device which acts to control the supply of intermittent current for determining the direction of rotation of the reversible motor controlling the speed of the machine, the arrangement being such that when the share of the load taken by an individual machine lies outside predetermined limits its load-sharing device acts to prevent the machine speed from being altered if such alteration would tend to make the load taken by the machine deviate further from such limits. Each load-sharing device may be operated differentially in accordance with the load on the associated machine and with the average load on all the machines, and may control contacts in the two relay-energizing circuits, whereby the appropriate relay is energized only when the load on the associated machine is such that the machine speed should be altered. When the invention is applied to the control of a group of electrically-driven rotary pumps, each load-sharing device may conveniently take the form of a differential relay whose two operating coils are energized respectively from a current transformer in the supply circuit of the electric motor driving the associated pump and from summation busbars connected to all the current transformers.

The invention may be carried into practice in various ways, but a preferred arrangement, in which the invention is applied to the control of a group of rotary pumps discharging into a common delivery pipe, is illustrated by way of example in Figure 1 of the accompanying drawings, Figure 2 showing a modification thereof.

In the arrangement of Figure 1, the common delivery pipe A supplied from the rotary pumps B is provided at a suitable point, at which constant pressure is to be maintained, with a pressure regulator C of suitable type. This regulator C may conveniently be of the kind in which a change of pressure from the desired value in the delivery pipe A actuates a Bourdon tube (when the pressures are relatively high) or a diaphragm (when the pressures are relatively low), the power in the movement being magnified by means of a pneumatic or hydraulic relay to control the movements of a piston $C^1$ carrying a contact arm $C^2$. Thus the Bourdon tube or the diaphragm may act to control the flow of fluid from an auxiliary high pressure source to the ends of a small cylinder $C^3$ within which the contact-carrying piston $C^1$ moves. When the pressure in the delivery pipe A is sufficiently close to the desired value, the contact arm $C^2$ occupies a neutral position, but an increase in pressure causes the arm to move over into engagement with a fixed contact $C^4$ connected to a lower-speed busbar D, whilst a decrease in pressure causes engagement with another fixed contact $C^5$ connected to a raise-speed busbar $D^1$.

The contact arm $C^2$ is connected through an intermittent contact-making device to one pole (say, the positive pole) of a D. C. source of power E. In one arrangement this device is in the form of a motor-driven interrupter F which serves to energize one or other of the two speed-controlling busbars D $D^1$ a predetermined number of times per minute, the length of impulse so obtained being adjusted to suit the particular machines to be controlled.

Each pump B is provided with a reversible D. C. controller motor G which acts in accordance with its direction of rotation to control the speed of the pump. Thus for instance in the case of an induction-motor-driven pump (as shown) the controller motor G may act through reduction gearing indicated at $G^1$ to vary the rotor resistance $G^2$ of the motor $G^3$, and in the case of a pump driven by a D. C. motor the field resistance of the motor may be varied, whilst for a steam-driven pump the controller motor may operate the governor speeder gear of the prime mover.

The polarity of the energizing current supplied from the D. C. source E to the controller motor G is determined by two contactors H $H^1$. Thus when the raise-speed contactor $H^1$ is energized to close its contacts the controller motor G will operate in one direction to raise the speed of the pump B, whilst the energization of the lower-speed contactor H will cause the controller motor G to lower the pump speed, the speed of the pump however remaining constant so long as neither contactor is energized. The operating coils of the two contactors H $H^1$ are connected on one side to the negative pole of the D. C. source E and on the other side respectively through the normally closed contacts J $J^1$ of a load-sharing device to the two speed-controlling busbars D $D^1$.

The load-sharing device is so arranged that it will open the contacts $J^1$ in circuit with the raise-speed contactor $H^1$ when the machine B is taking more than its proper share of the load or the contacts J in circuit with the lower-speed contactor H when the load on the machine is below the average. The device may be arranged in various ways, but in one convenient arrangement, applicable to the case when the machines are driven by A. C. motors $G^3$, it is in the form of a differential relay having two operating coils K $K^1$ which may be termed the machine coil and the average coil respectively. The average coils $K^1$ of all the load-sharing relays are connected across summation busbars $K^2$ which are energized from the secondaries $L^1$ of current transformers disposed in the supply circuits L of the A. C. driving motors $G^3$. Each machine coil K is connected in series with the associated current transformer secondary $L^1$. Thus, since the current flowing in the supply circuit L to the driving motor $G^3$ is a measure of the load on the machine B, each load-sharing relay K $K^1$ is operated differentially in accordance with the load on the associated machine and with the average load on all the machines.

The provision of a load-sharing arrangement as above described is of especial importance in cases where the various machines have different characteristics. When all the pumps are of the same size and type, it may be unnecessary to employ automatic load-sharing devices, and an initial hand setting may be sufficient to ensure a proper distribution of load amongst the machines, the pressure-regulating impulses then controlling all the machines simultaneously.

Thus in the arrangement above described a change in the load will cause a corresponding change in the pressure in the delivery pipe A, as the result of which the pressure regulator C will operate its contacts $C^2$ $C^4$ $C^5$ and connect up one or other of the speed-controlling busbars D $D^1$ (say, the raise-speed busbar $D^1$) through the interrupter F to the D. C. source E. If load-sharing devices are not provided, this will have the effect of intermittently energizing all the raise-speed contactors H¹. This will in turn cause the intermittent operation of the controller motors G, and the speed of all the machines B will be raised gradually until the desired pressure conditions are reestablished, when the pressure regulator C will deenergize the raise-speed busbar D¹. If on the other hand load-sharing devices are employed, the only machines affected will be those taking average or less than average load. In a similar manner if the change in load conditions is such as to require a reduction in machine speed, the energization of the lower-speed busbar D will cause the controller motors G to reduce the speed of all those machines which are taking average or more than average load.

The invention is especially applicable to the control of a group of pumps supplying boiler feed water for steam-turbine-driven alternators operating in parallel, and in this case, if means are provided for automatically controlling the frequency of the electrical system supplied by the alternators, the frequency controlling apparatus may itself be utilized as the source of intermittent current for energizing the speed-controlling contactors. Thus a convenient arrangement for such frequency control is described in the specification accompanying the copending patent application of the United States of America above referred to. In this arrangement a system of relays energized from a source of E. M. F. of standard frequency and from a second source of E. M. F. derived from the alternators acts to vary the speed of the alternators to bring the frequency of the system into agreement with the standard frequency. This system of relays, diagrammatically indicated at M in Figure 2, includes a relay (referred to as an auxiliary synchronizing relay) which receives its maximum energizing current when the two sources of E. M. F. have a predetermined phase relationship, so that its contacts M¹ repeatedly rise and fall when the two frequencies differ. If now a definite time delay relay N is provided which is operated by the rise and fall of the auxiliary synchronizing relay contacts M¹, its contacts N¹ can be utilized to provide the desired intermittent interruptions in the circuit controlled by the contacts C² C⁴ C⁵ of the pressure regulator C. This arrangement is especially advantageous since the frequency of the impulses in the circuits controlling the speed of the pumps is greatest when pressure correction is most required.

It will be appreciated that the above arrangements have been described by way of example only and may be modified in various ways within the scope of the invention.

What I claim as my invention and desire to secure by Letters Patent is:—

1. In a pressure-regulating arrangement for a group of pumps, compressors, blowers or like machines discharging into a common system, the combination of a reversible electric motor associated with each machine, means whereby such motor acts in accordance with its direction of rotation to raise or lower the speed of operation of the machine, a source of intermittently interrupted electric current, a device responsive to the pressure in the common discharge system, and contacts actuated by the pressure-responsive device controlling the supply of current from the source for determining the direction of rotation of the reversible motors, the arrangement being such that the reversible motors are caused to raise or lower the speed of the machines in accordance with whether the pressure in the system is below or above a predetermined value.

2. In a pressure-regulating arrangement for a group of pumps, compressors, blowers or like machines discharging into a common system, the combination of a reversible electric motor associated with each machine, means whereby such motor acts in accordance with its direction of rotation to raise or lower the speed of operation of the machine, a source of intermittently interrupted electric current, a device responsive to the pressure in the common discharge system, contacts actuated by such device, two circuits the selective connection of which to the source of intermittent current is controlled by the contacts of the pressure-responsive device, and two relays for each machine respectively energized from the two circuits and controlling the direction of energizing current supplied to the reverisble motor associated with the machine, the arrangement being such that the energizing current supplied to the reversible motors is in a direction to raise or lower the speed of the machines in accordance with whether the pressure in the system is below or above a predetermined value.

3. In a pressure-regulating arrangement for a group of pumps, compressors, blowers or like machines discharging into a common system, the combination of a reversible electric motor associated with each machine, means whereby such motor acts in accordance with its direction of rotation to raise or lower the speed of operation of the machine, a source of intermittently interrupted current, means responsive to the pressure in the common discharge system for controlling the supply of current from the source and thereby determining the direction of rotation of the reversible motors in accordance with whether the pressure in the system is below or above a predetermined value, and means for automatically ensuring a proper distribution of the load between the individual machines.

4. In a pressure-regulating arrangement for a group of pumps, compressors, blowers or like machines discharging into a common system, the combination of a reversible electric motor associated with each machine, means whereby such motor acts in accordance with its direction of rotation to raise or lower the speed of operation of the machine, a source of intermittently interrupted electric current, a device responsive to the pressure in the common discharge system, contacts actuated by such device controlling the supply of intermittent current for determining the direction of rotation of the reversible motors in accordance with whether the pressure in the discharge system is below or above a predetermined value, and a load-sharing device for each machine acting to control the supply of current for determining the direction of rotation of the associated reversible motor, the arrangement being such that when the share of the load taken by an individual machine lies outside predetermined limits its load-sharing device acts to prevent the machine speed from being altered if such alteration would tend to make the load taken by the machine deviate further from such limits.

5. In a pressure-regulating arrangement for a group of pumps, compressors, blowers or like machines discharging into a common system, the combination of a reversible electric motor associated with each machine, means whereby such motor acts in accordance with its direction of rotation to raise or lower the speed of operation of the machine, a source of intermittently interrupted electric current, a device responsive to the pressure in the common discharge system, contacts actuated by such device, two circuits the selective connection of which to the source of intermittent current is controlled by the contacts of the pressure responsive device, two relays for each machine respectively energized from the two circuits and controlling the direction of energizing current supplied to the reversible motor associated with the machine, a load-sharing device for each machine operated differentially in accordance with the load on the associated machine and with the average load on all the machines, and contacts on each load-sharing device controlling the energizing circuits of the two associated speed-controlling relays, the arrangement being such when the pressure-responsive device operates as the result of the pressure rising above or falling below a predetermined value the appropriate speed-controlling relay associated with any of the machines is energized only when the load on the machine is such that the machine speed should be altered.

6. In a pressure-regulating arrangement for a group of rotary pumps driven by electric motors and discharging into a common system, the combination of a reversible eletric motor associated with each pump, means whereby such reversible motor acts in accordance with its direction of rotation so to control the electric motor driving the associated pump as to raise or lower the speed of the pump, means responsive to the pressure in the pump discharge system for determining the direction of rotation of the reversible motors in accordance with whether the pressure in the system is below or above a predetermined value, a current transformer in the supply circuit to the electric motor driving each pump, summation busbars connected to all the current transformers, a differential load-sharing relay associated with each pump and having two operating coils energized respectively from the associated current transformer and from the summation busbars, and means whereby when the share of the load taken by an individual pump lies outside predetermined limits its load-sharing relay acts to prevent the pump speed from being altered as a result of the operation of the pressure-responsive means if such alteration would tend to make the load taken by the pump deviate further from such limits.

7. In a pressure-regulating arrangement for a group of pumps, compressors, blowers or like machines discharging into a common system, the combination of a reversible electric motor associated with each machine, means whereby such motor acts in accordance with its direction of rotation to raise or lower the speed of operation of the machine, means responsive to the pressure in the common discharge system for determining the direction of rotation of the reversible motors in accordance with whether the pressure in the system is below or above a predetermined value, a load-sharing device for each machine operated differentially in accordance with the load on the associated machine and with the average load on all the machines, and means whereby each load-sharing device prevents operation of the associated reversible motor unless the load on the associated machine is such that the machine speed should be altered.

In testimony whereof I have signed my name to this specification.

THOMAS REGINALD WARREN.